June 19, 1962  M. W. TOEPPER ET AL  3,039,136
APPARATUS FOR PREPARING SHAPED MEAT PRODUCTS
Original Filed Dec. 9, 1958  4 Sheets-Sheet 1
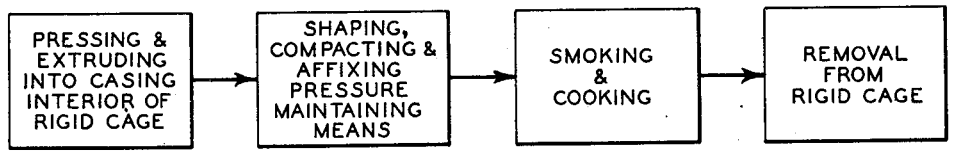
Fig. 1.
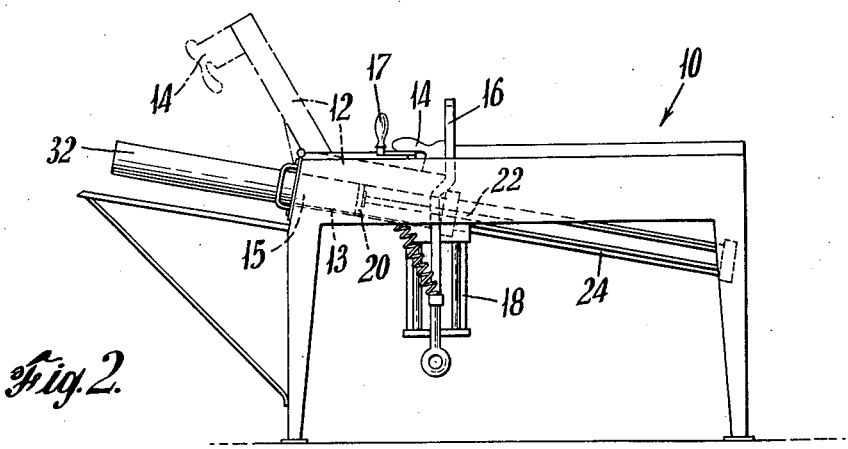
Fig. 2.
Fig. 3.
INVENTORS
MARVIN W. TOEPPER
HOWARD E. KASTING
BY
ATTORNEY

INVENTORS
MARVIN W. TOEPPER
HOWARD E. KASTING

BY

ATTORNEY

United States Patent Office 3,039,136
Patented June 19, 1962

3,039,136
APPARATUS FOR PREPARING SHAPED MEAT PRODUCTS
Marvin W. Toepper, Brookfield, and Howard E. Kasting, Park Forest, Ill., assignors to Union Carbide Corporation, a corporation of New York
Original application Dec. 9, 1958, Ser. No. 779,238, now Patent No. 3,011,895, dated Dec. 5, 1961. Divided and this application Nov. 23, 1960, Ser. No. 75,651
4 Claims. (Cl. 17—32)

This invention relates to a novel method and apparatus for preparing shaped meat products in cellulose casings. More specifically it relates to such a method and apparatus incorporating novel stuffing and pressing means to obtain a product having substantially square ends.

The manufacture and sale of sausage in the United States today is a major commercial enterprise. The 1957 total production was about several billion pounds, of which meat loaves, cooked and smoked meat rolls, constituted about 40 percent of this figure.

The upgrading of meat cuts by trimming, boning, seasoning, curing, shaping, and further preparation as by cooking and/or smoking, is an essential part of such meat packing operations.

Modern meat marketing developments have placed increasing emphasis on demands for unitized packages of pre-sliced meats, useful for sandwiches or other ready-to-serve table preparations. For such packages, the meat item is preferred in the form of a dense, homogeneous uniform chunk or slice, substantially free of voids and in a rectangular shape.

Such type of meat shaping is desirable for merchandising, smoked or cooked boneless hams, cooked corned beef, boneless beef rolls, boneless poultry and cominuted meats (sausage and meat loaves).

Slicing and unit packaging of previously processed cooked and smoked meats, is commonly done on high-speed automatic equipment. For efficient operation, such class of machinery demands as uniform size and density of meat product as it is possible to obtain. For example, a variation of plus or minus one eighth of an inch will cause one commonly used type of automatic packaging machine to operate poorly.

It is accordingly an object of this invention to provide a method and apparatus for obtaining a superior shaped meat product.

It is a further object to provide such a method and apparatus which produces a meat of uniform density and having substantially square ends.

It is a further object to provide a method for stuffing a meat product into a tubular casing material interior of a fenestrate cage.

It is a still further object to provide a method and apparatus for maintaining pressure on the ends of an encaged meat product during the entire processing cycle.

Other objects and advantages will be apparent from the description and drawings in which:

FIG. 1 is a block diagram illustrating the method steps of the instant process;

FIG. 2 is a side elevation, partly in section, of a meat forming press with attached extrusion horn for compressing the meat product and forcing it into a tubular cellulose casing;

FIG. 3 is a plan view of FIG. 2;

Figure 4:
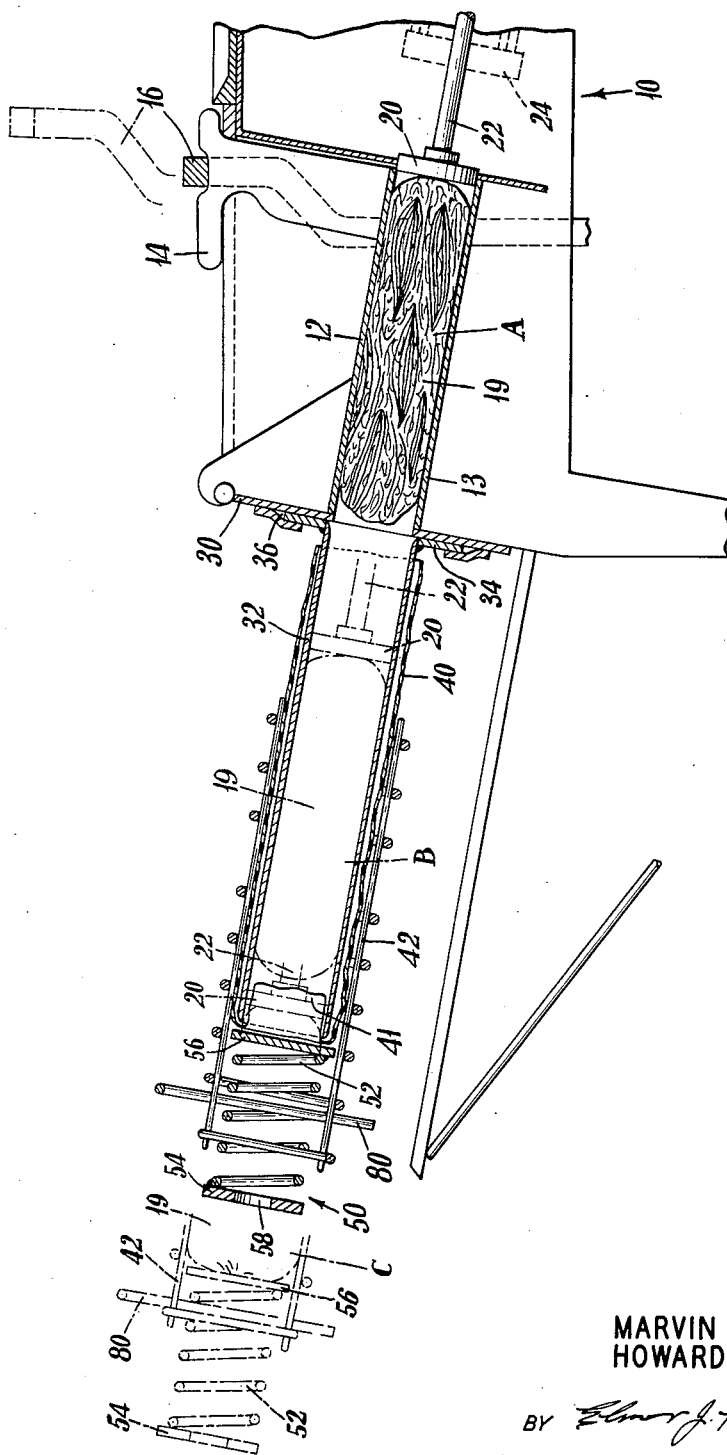
FIG. 4 is an enlarged side elevation in section of the horn, casing and cage, and portion of meat forming press and stuffing horn.

According to the invention there is provided a method and apparatus for preparing a shaped and packaged meat product which comprises generally the stuffing of a meat product into a cellulose casing while positioned completely interior of a fenestrate cage, applying axial pressure to both ends of the stuffed casing to compress and shape the meat product within the casing and to mold it to the interior dimensions of the fenestrate cage, and maintaining said end pressure on the encased meat product during subsequent processing steps.

The invention comprises two particularly novel aspects; firstly, the stuffing of the meat product into casing in place within the fenestrate shaping cage; and secondly, the concurrent application of pressure to both ends of the stuffed casing interior to the cage and maintaining said pressure during the entire processing cycle which may comprise cooking and/or smoking. The term square end so used herein refers to a flat end having a negligible radius of curvature where it abuts the ajoining sides.

The stuffing of the casing in place within the cage is accomplished by extruding the meat by means of a novel association of stuffing horn, casing, and cage which will be more fully described hereinafter. By stuffing the meat into the casing within the fenestrate cage the separate step of placing an encased meat item into the cage is avoided, and the casing can be stuffed with sufficient pressure to cause the encased article to fully fill out and conform to the cage shape to an extent not previously possible. This effect is of particular significance with non-comminuted meats such as boned ham, beef rolls, boned turkey, corned beef, etc. which have bone voids and are irregular in shape by nature and do not easily mold into a uniformly compact product.

The placing of pressure concurrently on both ends of the encaged meat is accomplished by using two slidable end plates within the fenestrate cage as will be more fully described below.

In the prior art pressing practices the compacting pressure is successively applied to each end of the encaged meat mass and the resultant pressure reaction is restrained by friction of the meat mass on the cage side walls. Concurrent pressurizing of both ends of the encased meat mass is independent of pressure reaction on the cage side walls, and this permits using higher compacting pressures than common in prior art, thereby yielding a more uniformly compacted meat mass.

The pressing pressure in the instant invention is maintained on the encased meat by the end plates throughout the processing cycle by means of resilient means associated with the end plates and locking means which maintain the resilient means in compressed condition also to be fully described hereinafter. The maintenance of the pressure on the encaged article throughout the cooking operation is of great importance in maintaining the square ends and maximum density of the final product as set forth previously since as the meat shrinks the end plates are continuously forced against same, maintaining maximum density and the said square ends. The invention is especially useful when used with cellulosic casings permeable to both air or smoke since the meat shrinks as it is cooked or smoked.

Specific details of a preferred apparatus utilized to accomplish the instant process will now be described with reference to the drawings.

The block diagram of FIG. 1 illustrates schematically the process of the instant invention. In the case of comminuted meats the "compressing" step comprises stuffing the casing with meat emulsion by means such as a pneumatic stuffer. In the case of the boned or rolled meats this step comprises shaping and compressing in a suitable press.

In stuffing, the meat product, whether comminuted or of the boned type, is expressed through an extruding horn into a permeable tubular casing positioned interior of a fenestrate shaping cage. The casing is within the fenestrate cage and both are telescoped over the extruding horn. As the casing is filled, both it and the fenestrate cage are forced off of the extruding horn.

The block labeled "shaping and compacting" represents the step of applying pressure concurrently to both ends of the encased meat product subsequent to its removal from the stuffing machine. This step is performed on a suitable pressing machine and includes applying pressure to the slidable ends of the fenestrate cage for axially pressing the encased meat product into conformity with the interior dimensions of the fenestrate cage and simultaneously compressing the resilient means affixed to the end plates.

The "affixing" step comprises locking in place the compressed resilient means associated with the end plate of the fenestrate cage to maintain pressure on the encaged meat product during subsequent processing operations after the fenestrate cage is removed from the pressing machine.

The next step includes cooking or smoking of the encased meat product with the resilient axial pressure maintained on said meat product.

After this processing step the resilient pressure is released and the product is removed from the cage and is ready for delivery to consumers.

Referring now to the drawings wherein like reference numbers designate like parts, in FIGURES 2, 3 and 4 the reference numeral 10 designates a conventional meat forming press. This unit has a U-shaped forming chamber 13 wherein a boned meat mass 19 as shown in FIG. 4 is placed. Handle 14 is connected to a hinged, movable cover 12 for chamber 13 and is designed for manually opening the cover 12 and for engagement by a gripping bar 16. After closing cover 12 on the meat mass 19, as shown in FIG. 4, gripping bar 16 engages cover 12 upon actuation of pneumatic cylinder 18, to press, compact and shape the meat confined in chamber 13. A movable end wall of chamber 13 opposite extrusion horn 32 is comprised of flat disc 20 connected by appropriate piston rod 22 to a second air cylinder 24.

Air cylinder 18 and extruding cylinder 24 are pneumatically controlled by hand lever 17 through conventional linkage and air valves not shown. After the meat is shaped as by compressing and compacting to the outlines of the chamber formed by the walls of members 12, 13 and 20, the air cylinder 24 is actuated, thereby completely extruding meat mass 19 through an opening 15 in chamber 13 and into and through abutting horn structure 32.

Referring to FIG. 4, the horn structure is new to the art and is comprised of an elongated, tubular member 32 having affixed flange 34 at one end thereof designed to engage and slide in slots 36 of a base plate 30 affixed to press 10. Before expressing the meat mass to and through the cylindrical horn 32, a reinforced cellulose casing 40 is sheathed onto the exterior of horn 32. Casing 40 is provided with a cuff 41 about 2 inches long, infolded into the exit orifice of horn 32. A square wire cage mold 42 is additionally sheathed over casing 40 in place on horn 32. A spring end plate unit 50 hereinafter further described, is positioned in the cage with retaining member 80 and abutting the cuff of casing 40.

Sections "A," "B" and "C" (of FIG. 4) illustrate progressive steps in extrusion of a meat mass from press 10 enveloped in casing 40 from horn 32 into cage 42. "A" shows the meat mass 19 while completely within the forming chamber of press 10. "B" shows the meat mass 19 partially extruded into horn 32. The casing cuff 41 interior to the horn is engaged by the advancing end of the meat mass which in turn engages the end plate 56 fastened to the cage 42, thereby simultaneously unsheathing both the casing 40 and cage, from the horn 32 as shown at C.

Figure 5:
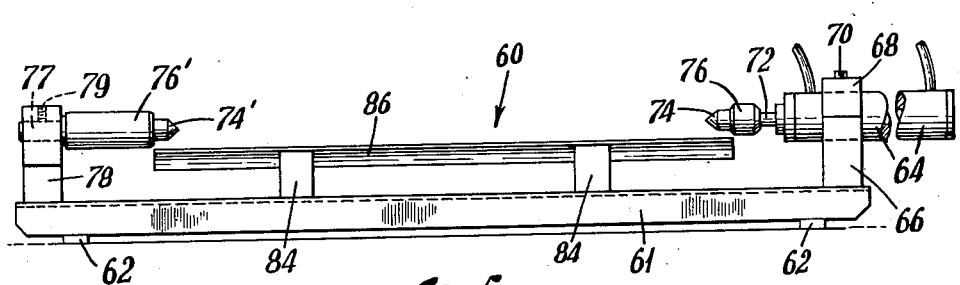
FIG. 5 is a side elevation of a meat mold press.
Figure 6:
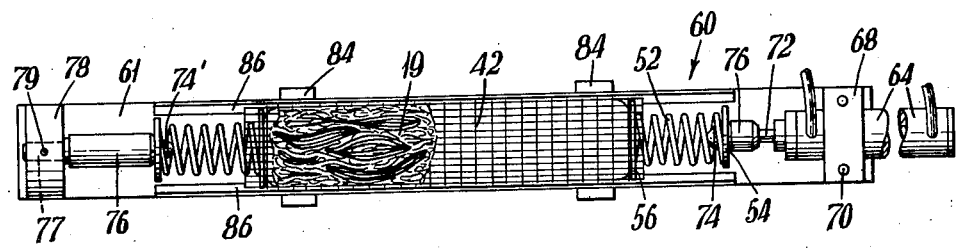
FIG. 6 is a plan view of a meat mold press loaded with a meat mass in a casing positioned within a fenestrate cage.
Figure 7:
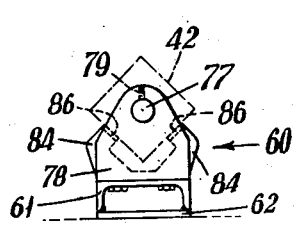
FIG. 7 is an end elevation of the press shown in FIG. 6.

Referring now to FIGURES 5, 6 and 7 the meat mold press 60 is comprised of a base 61, such as a structural steel channel shape about 5 ft. long and provided on the flanges thereof with a plurality of mounting plates 62 for fastening to a convenient work surface. An air cylinder 64 is horizontally disposed in a vertical clamping post 66 fastened to base 61. Clamping post 66 is machined to grip air cylinder 64 and through adjustment of clamping cap 68 fastened to post 66 by appropriate screw fastenings 70, permits axial adjustment of cylinder 64. The free end of air cylinder piston rod 72 is provided with retaining clip pilot portion 76 and cone-shaped ram pintle portion 74.

Vertical pedestal 78 is fastened to base 61 at the machine end opposite air cylinder 64. Pedestal 78 is bored to receive shoulder shaft 77 which is affixed as a cantilever therein by set screw 79. Shaft 77 is positioned parallel to and centered on the axis of air cylinder 64. Shaft 77 is provided with pilot portion 76' and shouldered down to pintle portion 74'. However, this is merely a preferred embodiment, the pintle portions 74 and 74' could be replaced by a flat surface at the pilots 76 and 76'.

Horizontal support for wire cage 42, is provided on the press 60 by guide rails 86 fastened to and supported from base 61 by brackets 84, to position the cage preferably at 45° to the horizontal and on the center line of air cylinder 64 and shaft 77.

Figure 8:
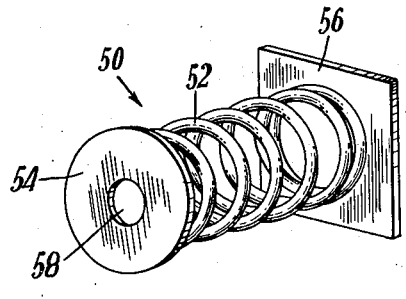
FIG. 8 is a perspective of a spring end plate for maintaining the encased mass under pressure during cooking.

Referring now to FIGURE 8, spring end plate unit 50 is made of a stainless steel coil spring 52 designed to carry a load of about 225 lbs. One end of spring 52 is fastened to stainless steel square end plate 56. The other end of spring 52 is fastened to a stainless steel round end plate 54 provided with central hole 58 of a diameter providing a free fit for pintles 74, 74'. The hole 58 is not essential and would not be used if a flat ended ram and stationary shaft not having pintles 74 and 74' were used. The illustrated spring end plate and the cooperating press structure is further described and claimed in Application Serial No. 779,193 of Mr. S. Simon et al. filed concurrently herewith entitled, "An Improved Apparatus for Use in the Production of Shaped Meat Products."

Figure 9:
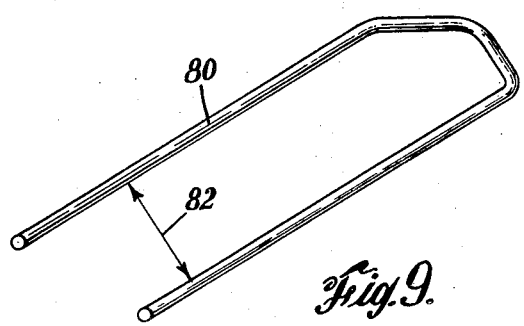
FIG. 9 is a perspective of a retaining pin for locking the spring end plate to the end of the fenestrate cage.

Referring now to FIGURE 9, retaining member 80 is made of ¼" diameter stainless steel rod bent to a U-shape with an inside span 82 made ⅛" wider than pilot 76, 76' diameter.

Figure 10:
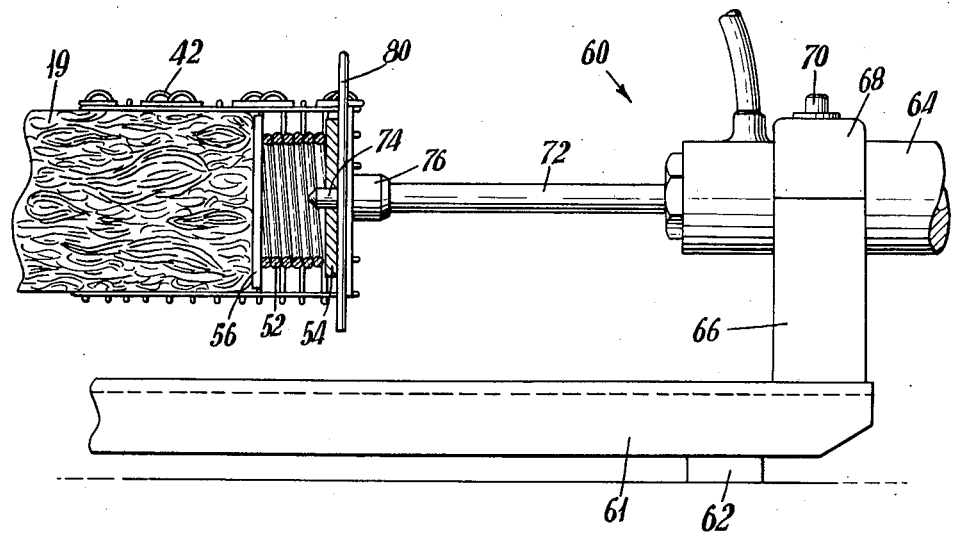
FIG. 10 is an enlarged side elevational view partly in section of the spring end plate and retaining pin in position within the cage after pressurizing.

As may be seen from FIG. 10, retaining member 80 is of sufficient length to pass entirely through the cage to lock the end plate assembly 50 in place.

FIG. 10 shows the press 60 with the meat mass under pressure. It has been found that subjecting the meat mass to between about 12–20 lbs. per sq. in. pressure gives satisfactory results. Springs 52 of end plate units 50 are fully compressed with all coils of the springs abutting, thereby transmitting the compressing force at right angles to press 60 axis from pintles 74, 74', through round end plate 54 to square end plate 56, thereby shaping the abutting ends of the meat mass square with the long axis thereof and retaining members 80 are in place, guided through appropriately chosen bars of cage 42 by pilot 76, 76' of press 60, to abut plate 54. It has been found that providing a compressing force of about 35 pounds in excess of that necessary to fully compress the springs 52, such as about 260 pounds, and that such compressed springs continuously applied a pressing pressure on the meat throughout the cooking operation.

The extension of shaft 77 cantilevered from pedestal 78 permits pintle 74' to enter the interior of the end of cage 42 without constraining the cage axially in the press. Guide rails 86 merely position the cage on the center line of press 60 and thus under pressure, the cage is substantially free to move axially, thereby permitting the meat mass to be pressurized equally concurrently at each end.

In a typical embodiment of the invention the meat mass 19 is placed in the chamber 13 of forming press 10 and the cover portion 12 forced closed to compress and shape the meat mass into conformity with the chamber 13. Next a cellulosic fibrous casing 40 is sheathed over extruding horn 32.

The end of the casing 40 extending beyond the terminus of the horn 32 is infolded into the interior of the horn 32 to form a cuff 41 of a depth such that on engagement of the cuff by the meat mass, the cuff is unfolded and covers the end of the meat mass when the latter is forced out of chamber 13.

An end plate assembly 50 is inserted in and temporarily secured in one end of a fenestrate shaping cage 42 by retaining pin 80. This assembly is then slipped on the extruding horn 32 and over the casing 40, whereby the end of the cage 42 having the pin fastened end plate assembly 50 is adjacent to the terminus of extruding horn 32. Next, the air cylinder 24 is actuated causing piston rod 22 and attached disc 20 to force the meat mass 19 out of chamber 13 and through extruding horn 32 initially engaging casing cuff 41 and unfolding said cuff against end plate assembly 50. Further movement of the meat mass 19, pushing against the end plate assembly 50 conjointly unsheathes and fills the casing 40 while pushing therewith the fenestrate cage 42 longitudinally along the extruder horn 32. Upon complete rejection of the meat mass 19 from the chamber 13 and horn 32, the cage 42 and resultant encased mass are removed from the horn 32.

A second end plate assembly 50 is placed in the end of the fenestrate cage through which the meat mass was extruded.

The casing 40 is of such length that after stuffing with a meat mass there is a sufficient length of unfilled casing at the end immediately adjacent to flange 34 to form a closure for the extruded meat mass, as by folding, twisting or crumpling said unfilled length.

The fenestrate cage and its enclosed contents of encased meat is then placed in compacting press 60 movable piston rod 76 being retracted sufficiently to permit positioning of the cage on the rails 86. The retaining pin 80 of the first installed end plate assembly is removed. The air cylinder 64 is then actuated causing piston rod 72 to move toward the end plate assembly 50 immediately adjacent thereto. Upon engagement therewith the cage 42 is pushed firmly against the pilot portion 76' of cantilevered shaft 77 which contacts the end plate assembly 50 at this end of the cage. As further pressure is applied by piston rod 72, the springs 52 in each end plate assembly 50 are fully compressed and the meat mass within the cage between the two end plate assemblies is compacted and caused to conform intimately with the interior surfaces of the cage. With the pressure from the cylinder 64 still maintained so the springs 52 remain compressed, and preferably fully compressed for maintaining maximum possible pressure on the meat throughout subsequent cooking operation retaining pins 80 are inserted at each end of the cage 42 through the openings in the cage as near as possible to the plates 54, on the opposite side from the springs, to maintain same in the maximum compressed condition when the pressure applying members 76 and 76' are removed.

Next pressure is released from cylinder 64 causing piston rod 72 to withdraw from engagement with one end plate assembly. The fenestrate cage containing the compacted meat mass and having the two fully compressed end plate assemblies locked in place to maintain pressure thereon is removed from the press.

The thus encaged meat is processed by smoking and/or cooking, pressing pressure being maintained on the meat throughout the cycle by resilient means associated with the end plates 50 and locking means 80 and when this process is completed the retaining pins 80 are removed, the end plate assemblies withdrawn, and the cage is opened for removal of the encased, shaped meat product.

The thus encaged meat is processed by smoking and/or cooking and when this process is completed the retaining pins 80 are removed, the end plate assemblies withdrawn, and the cage is opened for removal of the encased, shaped meat product.

Figure 11:
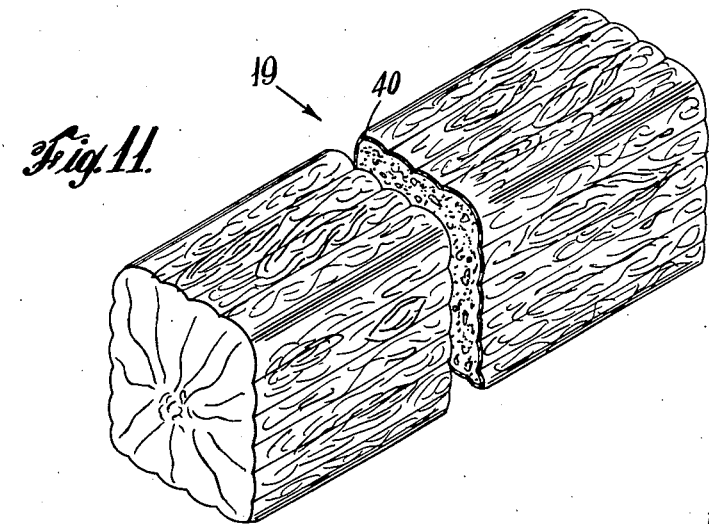
FIG. 11 is a perspective view of a meat product subsequent to removal from the cage.

FIG. 11 shows a finished meat product with the casing thereon after processing and removal from the wire shaping cage. The substantially square end resulting from the instant process is clearly shown.

The term fenestrate cage is intended to include not only a welded wire cage as set forth and described previously, but could also comprise a woven wire cage or a sheet metal cage having a plurality of openings therein.

While a substantially square cross section product is shown, it is to be understood that a round or oval cage could be used equally well, provided the end plate used conformed to the cross sectional shape of the cage, to give a flat end of substantially the same area as a cross section and the square corner set forth supra. The stainless steel element described in the embodiment is preferred because of its resistance to corrosion, however other non-corrosive metals such as Monel and other nickel alloys can be substituted as well as other metals suitably protected as by tinning or inert plastic coatings as will be understood by those skilled in the art.

As stated previously the instant process is of greatest utility when used with casings permeable to air or smoke to obtain optimum density of the final product.

The type of casing used in the instant process is preferably regenerated cellulose with a fiber web imbedded therein. Before such a casing is stuffed it is preferably soaked in water to make it pliable.

A novel method together with a preferred apparatus for effecting an improved shaped meat product has thus been disclosed and described. The resultant product has considerably less waste than shapes obtained with prior processes. In addition, the increased and more uniform density has considerable advantage in subsequent slicing and packaging operations.

While specific embodiments have been disclosed, it is to be understood that minor changes, substitutions and modifications could be made by a person skilled in the art without departing from the spirit and scope of the invention.

What is claimed is:

1. Apparatus for shaping a meat product within a permeable casing which comprises a fenestrate shaped cage for receiving the encased meat product and having axially slidable end plates therein, resilient means associated with said end plates on the outer side thereof, a press having a bed for receiving said fenestrate cage, the cage being slidable upon said bed, means at either end of said press for concurrently applying pressure to said two end plates through said resilient means and for compressing said resilient means, and further means for locking the end plates and the resilient means in compressed condition.

2. An apparatus as set forth in claim 1 wherein said resilient means comprise coil springs, said spring having attached thereto at the opposite end from the end plates additional means for engaging the means at either end of the press for applying pressure.

3. An apparatus as set forth in claim 1 wherein the means for concurrently applying pressure to the two end plates of the fenestrate shaping cage comprises a movable ram at one end of the press and a fixed member at the other end, both the ram and the fixed member having means thereon adapted to engage the movable end plates of the cage.

4. An apparatus as set forth in claim 3 wherein the movable ram is fluid actuated.

References Cited in the file of this patent
UNITED STATES PATENTS

| | | |
|---|---|---|
| 1,165,223 | Butz | Dec. 21, 1915 |
| 2,101,755 | Rosenstone et al. | Dec. 7, 1937 |
| 2,337,406 | Opie | Dec. 21, 1943 |
| 2,912,924 | Dahl et al. | Nov. 17, 1959 |